United States Patent
Shacham et al.

(10) Patent No.: US 9,690,720 B2
(45) Date of Patent: Jun. 27, 2017

(54) PROVIDING COMMAND TRAPPING USING A REQUEST FILTER CIRCUIT IN AN INPUT/OUTPUT VIRTUALIZATION (IOV) HOST CONTROLLER (HC) (IOV-HC) OF A FLASH-MEMORY-BASED STORAGE DEVICE

(71) Applicant: QUALCOMM Incorporated, San Diego, CA (US)

(72) Inventors: Assaf Shacham, Zichron Yaakov (IL); Maya Haim, Haifa (IL); Lee Susman, Burgata (IL); David Teb, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 14/728,400

(22) Filed: Jun. 2, 2015

(65) Prior Publication Data

US 2015/0347017 A1 Dec. 3, 2015

Related U.S. Application Data

(60) Provisional application No. 62/007,123, filed on Jun. 3, 2014.

(51) Int. Cl.
*G06F 12/00* (2006.01)
*G06F 13/16* (2006.01)
*G06F 3/06* (2006.01)

(52) U.S. Cl.
CPC .......... *G06F 13/1642* (2013.01); *G06F 3/061* (2013.01); *G06F 3/0664* (2013.01);
(Continued)

(58) Field of Classification Search
CPC .... G06F 13/1642; G06F 3/0664; G06F 3/061; G06F 3/0688; G06F 3/0659; G06F 3/0679; G06F 13/16; G06F 3/06
(Continued)

(56) References Cited

U.S. PATENT DOCUMENTS 7,480,784 B2 1/2009 Hummel et al.
7,571,295 B2 8/2009 Sakarda et al.
(Continued)

FOREIGN PATENT DOCUMENTS

EP 2492916 A1 8/2012
WO 2012143945 A2 10/2012
(Continued)

OTHER PUBLICATIONS

Author Unknown, "Embedded MultiMediaCard (e•MMC) e•MMC/Card Product Standard, High Capacity, including Reliable Write, Boot, Sleep Modes, Dual Data Rate, Multiple Partitions Supports and Security Enhancement," JEDEC Solid State JESD84-A44, Mar. 2009, JEDEC Solid State Technology Association, 234 pages.

(Continued)

*Primary Examiner* — Hong Kim
(74) *Attorney, Agent, or Firm* — Withrow & Terranova, PLLC

(57) ABSTRACT

Command trapping in an input/output virtualization (IOV) host controller (HC) (IOV-HC) of a flash-memory-based storage device is disclosed. In one aspect, an IOV-HC is configured to receive a request from a client register interface (CRI) of one of multiple input/output (I/O) clients. The IOV-HC inspects a content of the request prior to the request being passed to a transport protocol engine. Based on the content, the IOV-HC determines whether the request should be further processed or should be trapped. If the IOV-HC determines that the request should be trapped, the IOV-HC traps the request using a request trap. In some aspects, the IOV-HC generates an interrupt to a virtual machine manager (VMM) to notify the VMM that the request was trapped. In some aspects, the IOV-HC provides a response generation circuit to receive instructions from the VMM to generate a (Continued)

response to the CRI from which the trapped request originated.

16 Claims, 9 Drawing Sheets

(52) U.S. Cl.
CPC .............. *G06F 3/0688* (2013.01); *G06F 3/06* (2013.01); *G06F 13/16* (2013.01)

(58) Field of Classification Search
USPC ........................ 711/154, 103; 710/5; 709/201
See application file for complete search history.

(56) References Cited

U.S. PATENT DOCUMENTS

| | | | |
|---|---|---|---|
| 7,802,060 | B2 | 9/2010 | Hildebrand |
| 7,873,770 | B2 | 1/2011 | Hummel et al. |
| 8,301,715 | B2 | 10/2012 | Ittah et al. |
| 8,631,212 | B2 | 1/2014 | Kegel et al. |
| 8,793,364 | B1 | 7/2014 | Barkelew et al. |
| 8,949,517 | B2 | 2/2015 | Cohen et al. |
| 8,996,734 | B2 | 3/2015 | Kanigicherla et al. |
| 9,003,088 | B2 | 4/2015 | Chandrasekhar et al. |
| 9,632,953 | B2* | 4/2017 | Shacham ................ G06F 13/16 |
| 2010/0161936 | A1 | 6/2010 | Royer et al. |
| 2011/0276817 | A1 | 11/2011 | Fullerton et al. |
| 2011/0283046 | A1 | 11/2011 | Koseki |
| 2012/0030408 | A1 | 2/2012 | Flynn et al. |
| 2013/0060981 | A1* | 3/2013 | Horn ....................... G06F 13/16 710/107 |
| 2013/0159572 | A1 | 6/2013 | Graham et al. |
| 2013/0275656 | A1 | 10/2013 | Talagala et al. |
| 2013/0290606 | A1 | 10/2013 | Alessi et al. |
| 2014/0040382 | A1 | 2/2014 | Kanigicherla et al. |
| 2014/0040527 | A1 | 2/2014 | Kanigicherla et al. |
| 2014/0068137 | A1 | 3/2014 | Kegel et al. |
| 2014/0168682 | A1 | 6/2014 | Muto |
| 2014/0298056 | A1 | 10/2014 | Seki et al. |
| 2014/0325013 | A1* | 10/2014 | Tamir .................... G06F 15/167 709/212 |
| 2014/0331223 | A1 | 11/2014 | Lee et al. |
| 2015/0012671 | A1 | 1/2015 | Park et al. |
| 2015/0074338 | A1* | 3/2015 | Raviv ................... G06F 13/385 711/103 |
| 2015/0242268 | A1* | 8/2015 | Wu ...................... G06F 11/1012 714/773 |
| 2015/0346795 | A1 | 12/2015 | Shacham et al. |
| 2015/0347016 | A1* | 12/2015 | Shacham .................. G06F 3/06 711/103 |
| 2015/0347017 | A1* | 12/2015 | Shacham ................ G06F 3/061 711/103 |

FOREIGN PATENT DOCUMENTS

| | | |
|---|---|---|
| WO | 2013109640 A1 | 7/2013 |
| WO | 2014141140 A1 | 9/2014 |

OTHER PUBLICATIONS

Author Unknown, "Universal Flash Storage (UFS 1.1)," JEDEC Standard JESD220A, Jun. 2012, JEDEC Solid State Technology Association, 408 pages.
Author Unknown, "Device.Storage Requirements," Microsoft, Jan. 17, 2014, 130 pages.
Author Unknown, "Universal Flash Storage (UFS) Host Controller Interface," JEDEC Standard JESD223, Aug. 2011, JEDEC Solid State Technology Association, 58 pages.
De Jong, I.J., "System Exploration of Next Generation Flash Devices," Thesis, Faculty Electronic Engineering and Faculty Wiskunde & Informatica, Eindhoven University of Technology, Aug. 2012, 79 pages.
Second Written Opinion for PCT/US2015/033970, mailed May 12, 2016, 5 pages.
International Search Report and Written Opinion for PCT/US2015/033970, mailed Aug. 12, 2015, 10 pages.
International Preliminary Report on Patentability for PCT/US2015/033970, mailed Aug. 1, 2016, 27 pages.

* cited by examiner

PROVIDING COMMAND TRAPPING USING A REQUEST FILTER CIRCUIT IN AN INPUT/OUTPUT VIRTUALIZATION (IOV) HOST CONTROLLER (HC) (IOV-HC) OF A FLASH-MEMORY-BASED STORAGE DEVICE

PRIORITY CLAIM

The present application claims priority to U.S. Provisional Patent Application Ser. No. 62/007,123 filed on Jun. 3, 2014 and entitled "COMMAND TRAPPING IN A MULTI-CLIENT UNIVERSAL FLASH STORAGE (UFS) HOST CONTROLLER," the contents of which is incorporated herein by reference in its entirety.

BACKGROUND

I. Field of the Disclosure

The technology of the disclosure relates generally to flash-memory-based storage in mobile computing devices.

II. Background

Flash memory is a non-volatile data storage medium to which data may be electronically written and erased. Flash memory is presently used in a variety of flash-memory-based storage devices, including memory cards, solid-state drives, and Universal Serial Bus (USB) flash drives. Flash-memory-based storage devices may offer fast read and write times comparable to dynamic Random Access Memory (RAM) while providing higher durability and shock resistance than conventional hard disks.

To facilitate the widespread use of flash-memory-based storage devices, a number of standards have been developed or are currently under development. One such standard is Universal Flash Storage (UFS), developed by the Joint Electron Device Engineering Council (JEDEC) for flash-memory-based storage in mobile computing devices, such as smart phones and tablet computers. UFS adopts the Small Computer System Interface (SCSI) Architecture Model and command protocols supporting multiple commands with command queuing features, thus enabling a multi-thread programming paradigm. Another standard developed by JEDEC is the Embedded MultiMediaCard (eMMC) standard, which offers a simplified application interface design, small package sizes, and low power consumption. eMMC flash-memory-based storage devices are presently one of the primary forms of storage in mobile devices.

Conventional flash-memory-based storage device standards, such as UFS and eMMC, are currently designed for management and usage by a single input/output (I/O) client. However, many modern computing devices are capable of supporting multiple I/O clients (e.g., hosts or other processor subsystems) simultaneously using virtualization environments. In such virtualization environments, multiple I/O clients may each need to interact with a single flash-memory-based storage device as if it were the only host of the flash-memory-based storage device. Similarly, the flash-memory-based storage device may need to operate as if it is communicating with only a single I/O client, when, in fact, it is communicating with multiple I/O clients.

In particular, when flash-memory-based storage standards are extended to a multi-host environment, requests and/or commands from multiple I/O clients may require additional processing and/or filtering. For instance, a request may need to be processed to determine whether the request may be sent to the flash-memory-based storage device, or whether the request should be modified or discarded.

SUMMARY OF THE DISCLOSURE

Aspects disclosed in the detailed description include command trapping in an input/output virtualization (IOV) host controller (HC) (IOV-HC) of a flash-memory-based storage device. In one aspect, an IOV-HC is configured to receive a request (e.g., a transfer request (TR) or a task management request (TMR), as non-limiting examples) from a client register interface (CRI) corresponding to one of multiple input/output (I/O) clients. The IOV-HC inspects a content of the request prior to the request being passed to a transport protocol engine. Based on the content of the request, the IOV-HC may determine whether the request should be further processed (e.g., by an access control circuit or by a multi-host power controller (MHPC), as non-limiting examples), or whether the request should be trapped. If the IOV-HC determines that the request should be trapped, the IOV-HC traps the request using a request trap, and in some aspects may generate an interrupt to a virtual machine manager (VMM) to notify the VMM that the request was trapped. Some aspects of the IOV-HC may also provide a response generation circuit enabling the VMM to direct the IOV-HC to generate a response to the CRI from which the trapped request originated. In this manner, the IOV-HC may extend the functionality of the flash-memory-based storage device to multiple I/O clients.

In another aspect, an IOV-HC is provided. The IOV-HC is communicatively coupled to a plurality of I/O clients via a corresponding plurality of CRIs, and to a flash-memory-based storage device. The IOV-HC comprises a request trap. The IOV-HC is configured to receive, by a request filter circuit of the IOV-HC, a request directed to the flash-memory-based storage device from a CRI of the plurality of CRIs. The IOV-HC is further configured to inspect, by the request filter circuit, a content of the request. The IOV-HC is also configured to determine, by the request filter circuit, whether the request should be forwarded to the flash-memory-based storage device for processing or should be trapped, based on the content. The IOV-HC is additionally configured to forward the request to the flash-memory-based storage device, responsive to determining that the request should be forwarded to the flash-memory-based storage device for processing. The IOV-HC is further configured to trap the request in the request trap, responsive to determining that the request should be trapped.

In another aspect, a method for providing command trapping for a flash-memory-based storage device for multiple hosts is provided. The method comprises receiving, by a request filter circuit of an IOV-HC, a request directed to the flash-memory-based storage device from a CRI of a plurality of CRIs. The method further comprises inspecting, by the request filter circuit, a content of the request. The method also comprises determining, by the request filter circuit, whether the request should be forwarded to the flash-memory-based storage device for processing or should be trapped in a request trap, based on the content. The method additionally comprises, responsive to determining that the request should be forwarded to the flash-memory-based storage device for processing, forwarding the request to the flash-memory-based storage device. The method further comprises, responsive to determining that the request should be trapped, trapping the request in the request trap.

In another aspect, an IOV-HC is provided. The IOV-HC comprises a means for receiving a request directed to a flash-memory-based storage device from a CRI of a plurality of CRIs. The IOV-HC further comprises a means for inspecting a content of the request. The IOV-HC also comprises a means for determining whether the request should be forwarded to the flash-memory-based storage device for processing or should be trapped, based on the content. The IOV-HC additionally comprises a means for forwarding the request to the flash-memory-based storage device responsive to determining that the request should be forwarded to the flash-memory-based storage device for processing. The IOV-HC further comprises a means for trapping the request in a request trap responsive to determining that the request should be trapped.

DETAILED DESCRIPTION

Figure 1:
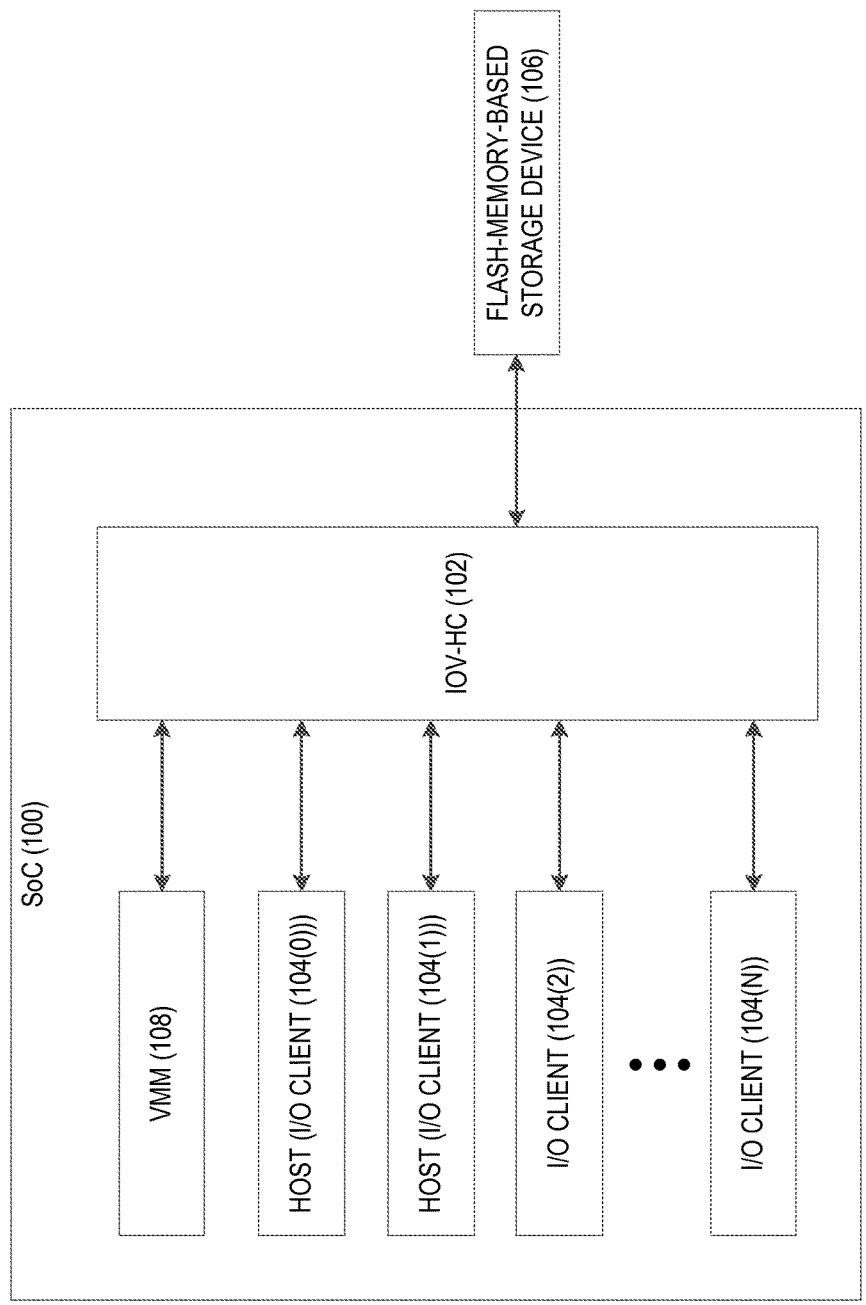
FIG. 1 is a block diagram of an exemplary system-on-chip (SoC) including multiple input/output (I/O) clients communicatively coupled to an exemplary flash-memory-based storage device via an exemplary input/output virtualization (IOV) host controller (HC) (IOV-HC)

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include command trapping in an input/output virtualization (IOV) host controller (HC) (IOV-HC) of a flash-memory-based storage device. In one aspect, an IOV-HC is configured to receive a request (e.g., a transfer request (TR) or a task management request (TMR), as non-limiting examples) from a client register interface (CRI) corresponding to one of multiple input/output (I/O) clients. The IOV-HC inspects a content of the request prior to the request being passed to a transport protocol engine. Based on the content of the request, the IOV-HC may determine whether the request should be further processed (e.g., by an access control circuit or by a multi-host power controller (MHPC), as non-limiting examples), or whether the request should be trapped. If the IOV-HC determines that the request should be trapped, the IOV-HC traps the request using a request trap, and in some aspects may generate an interrupt to a virtual machine manager (VMM) to notify the VMM that the request was trapped. Some aspects of the IOV-HC may also provide a response generation circuit enabling the VMM to direct the IOV-HC to generate a response to the CRI from which the trapped request originated. In this manner, the IOV-HC may extend the functionality of the flash-memory-based storage device to multiple I/O clients.

In this regard, FIG. 1 is a block diagram of an exemplary system-on-chip (SoC) 100 including an IOV-HC 102. In the example of FIG. 1, the IOV-HC 102 is provided to enable a plurality of I/O clients 104(0)-104(N) to access a single flash-memory-based storage device 106. In some aspects, the flash-memory-based storage device 106 may comprise a Universal Flash Storage (UFS) device or an Embedded MultiMediaCard (eMMC) device, as non-limiting examples. Notably, while the flash-memory-based storage device 106 is embedded adjacent to the SoC 100 within a mobile device in this aspect, other aspects may achieve similar functionality when employing the flash-memory-based storage device 106 as a removable memory device.

The SoC 100 also includes a virtual machine manager (VMM) 108, which provides virtualization functionality and management for the I/O clients 104(0)-104(N). The VMM 108 may be a software module that is executed by a processor of the SoC 100, and is resident in the system memory (not shown) of the SoC 100 or other memory location as needed or desired. Each of the I/O clients 104(0)-104(N) may comprise a host software entity (such as the I/O client 104(0) and the I/O client 104(1) of FIG. 1), which is executed on the processor of the SoC 100 and/or on a processor subsystem (not shown) in the SoC 100. The IOV-HC 102 may act as an intermediary between the I/O clients 104(0)-104(N) and the flash-memory-based storage device 106. In this manner, the IOV-HC 102 may control interactions between the I/O clients 104(0)-104(N) and the flash-memory-based storage device 106 such that the I/O clients 104(0)-104(N) each interact with the flash-memory-based storage device 106 as if it were the only I/O client 104(0)-104(N) communicating with the flash-memory-based storage device 106. Similarly, the IOV-HC 102 may be configured to enable the flash-memory-based storage device 106 to operate as if it is communicating with only a single I/O client 104(0)-104(N), when, in fact, it is communicating with multiple I/O clients 104(0)-104(N).

Figure 2:
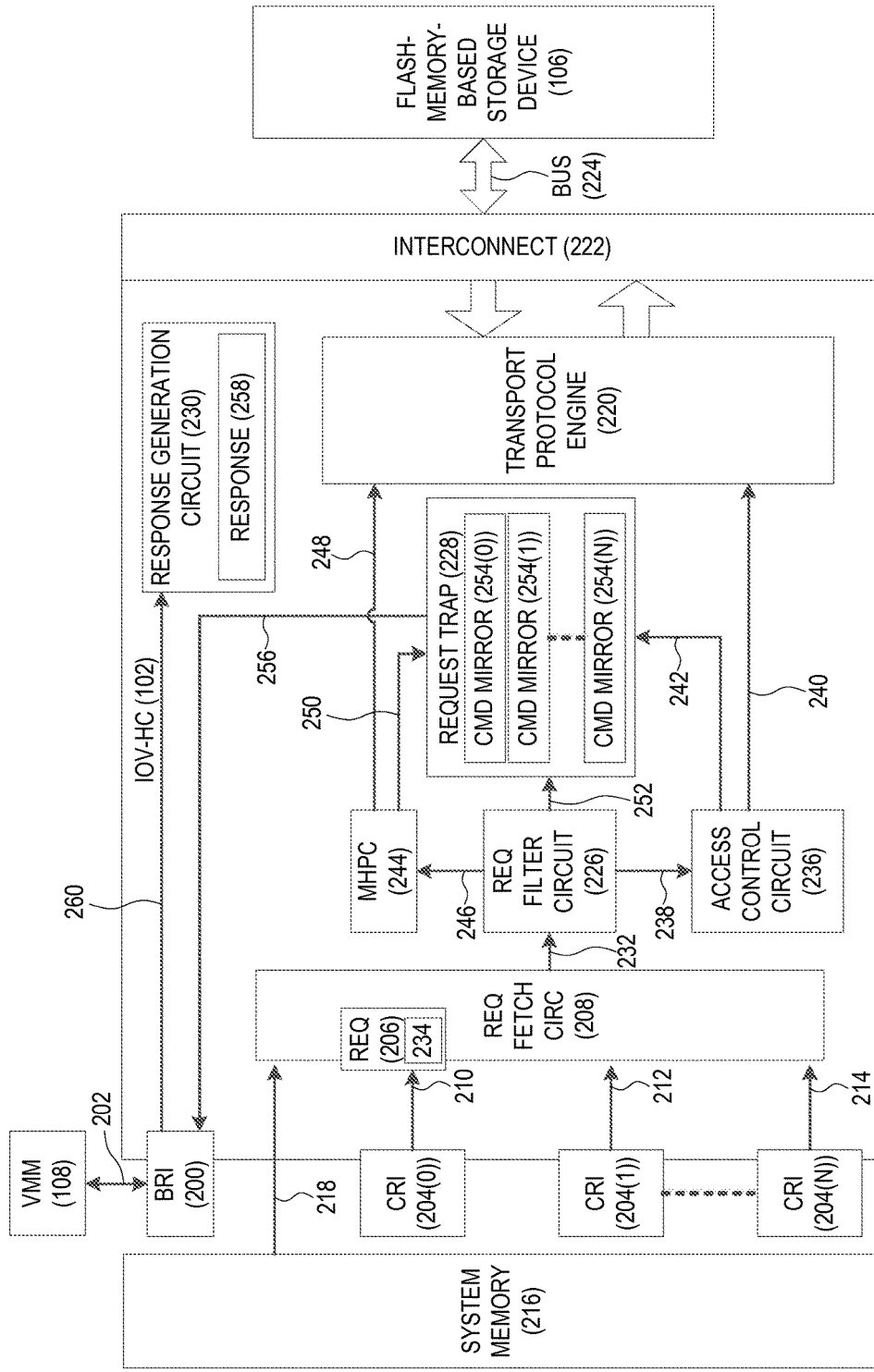
FIG. 2 is a block diagram of exemplary elements and communications flows within the IOV-HC of FIG. 1 for providing command trapping for multiple I/O clients.

To better illustrate exemplary constituent elements and communications flows within the IOV-HC 102 of FIG. 1 according to some aspects, FIG. 2 is provided. It is to be understood that the IOV-HC 102 may include more or fewer elements than illustrated in FIG. 2, according to the needs of the flash-memory-based storage device 106 standard (e.g., UFS or eMMC, as non-limiting examples) in use. As seen in FIG. 2, the IOV-HC 102 includes a base register interface (BRI) 200 through which the VMM 108 of FIG. 1 may communicate with the IOV-HC 102, as indicated by arrow 202. The IOV-HC 102 also includes client register interfaces (CRIs) 204(0)-204(N). Each of the CRIs 204(0)-204(N) represents an interface for corresponding ones of the I/O clients 104(0)-104(N) of FIG. 1 to transmit a request, such as a request 206 sent by the CRI 204(0), to the IOV-HC 102. As non-limiting examples, the request 206 may comprise a transfer request (TR) and/or a task management request (TMR). According to some aspects disclosed herein, the request 206 may comprise a read request, a write request, a power control request (e.g., a Small Computer System Interface (SCSI) START_STOP_UNIT (SSU) request or an eMMC SLEEP request), and/or other requests. The CRIs 204(0)-204(N) may also be used to transmit other types of requests or commands 206, such as query requests or no-operation (NOP) instructions.

As seen in FIG. 2, the CRIs 204(0)-204(N) are communicatively coupled to a request fetch circuit (REQ FETCH CIRC) 208 of the IOV-HC 102, as indicated by arrows 210, 212, and 214, respectively. In some aspects, the request fetch circuit 208 may be responsible for fetching a transport protocol descriptor, such as a UFS Transport Protocol (UTP) Transfer Request Descriptor (UTRD) (not shown) or an eMMC Task Descriptor (TD), from a system memory 216, and decoding the transport protocol descriptor to determine a location of a command descriptor, such as a UTP command descriptor (UCD) (not shown). The request fetch circuit 208 may then fetch a TR section (not shown) of the command descriptor from the system memory 216, as indicated by arrow 218.

In a conventional UFS or eMMC host controller, the request fetch circuit 208 would next extract parameters from the fetched request 206, and forward the entire fetched request 206 to a transport protocol engine 220 (e.g., a UTP engine or an eMMC transport protocol engine, as non-limiting examples) for processing. The fetched request 206 may then be transmitted to the flash-memory-based storage device 106 via an interconnect 222 and a bus 224. However, in a multi-client environment, additional inspection and processing of the request 206 may be required. For instance, it may be desirable to provide custom handling for requests 206 of different types, or to trap and/or terminate a fetched request 206.

Accordingly, the IOV-HC 102 is configured to provide command trapping functionality. The IOV-HC 102 may thus include a request filter circuit (REQ FILTER CIRCUIT) 226 for receiving, inspecting, and processing requests 206, a request trap 228 for command trapping, and a response generation circuit 230 for facilitating the transmission of responses to the I/O clients 104(0)-104(N). Operations of the request filter circuit 226, the request trap 228, and the response generation circuit 230 are discussed in greater detail below.

With continuing reference to FIG. 2, every request 206 fetched by the request fetch circuit 208 is received by the request filter circuit 226 of the IOV-HC 102, as indicated by arrow 232. The request filter circuit 226 is responsible for inspecting and processing the request 206. In particular, the request filter circuit 226 determines how the request 206 is to be processed based on a content 234 of the request 206. As non-limiting examples, in some aspects based on the UFS standard, the request filter circuit 226 may examine a transaction code (TC) and a SCSI op-code (OPC) of the content 234 of the request 206 to determine how the request 206 should be handled. Similarly, in aspects based on the eMMC standard, the request filter circuit 226 may examine a Command Index and a Command Argument of the content 234 of the request 206 to determine how the request 206 should be handled. Based on the content 234 of the request 206, the request filter circuit 226 may determine that the request 206 is to be forwarded on to the flash-memory-based storage device 106 for processing, or may determine that the request 206 should be trapped. The VMM 108 may subsequently determine whether the trapped request 206 should be modified and reissued to the flash-memory-based storage device 106, or whether the trapped request 206 should be terminated.

In some aspects, the request filter circuit 226 may inspect the content 234 of the request 206 to determine whether the request 206 is a read command, a write command, a power mode change command, or another type of command. If the content 234 of the request 206 indicates that the request 206 corresponds to a read or write command, the request 206 may be forwarded by the request filter circuit 226 to an access control circuit 236, as indicated by arrow 238. The access control circuit 236 according to some aspects provides hardware enforcement of read/write access rules to logical units (not shown). If the request 206 subsequently is validated by the access control circuit 236, the request 206 is passed on to the transport protocol engine 220, as indicated by arrow 240. However, requests 206 that are denied by the access control circuit 236 are trapped for software processing, as indicated by arrow 242. Operations associated with trapping the request 206 are discussed in greater detail below.

According to some aspects, the content 234 of the request 206 may indicate that the request 206 corresponds to a power mode change command. As non-limiting examples, in aspects based on the UFS standard, the content 234 may indicate that the request 206 is a SCSI SSU command, while in aspects based on the eMMC standard, the content 234 may indicate that the request 206 is an eMMC Sleep (CMD5) command. Consequently, the fetched request 206 may be sent to an MHPC 244 by the request filter circuit 226, as indicated by arrow 246. The MHPC 244 according to some aspects comprises a hardware state machine (not shown) that implements a voting mechanism between the I/O clients 104(0)-104(N) of FIG. 1 to control a power mode of the flash-memory-based storage device 106. If the fetched request 206 is successfully processed by the MHPC 244, the fetched request 206 may be passed to the transport protocol engine 220, as indicated by arrow 248. Otherwise, the MHPC 244 may silently terminate the fetched request 206, or may trap the fetched request 206 for further processing, as indicated by arrow 250. If the fetched request 206 corresponds to a command other than a read command, a write command, or a power mode change command, the request filter circuit 226 may intercept and trap the fetched request 206 in the request trap 228, as indicated by arrow 252.

The request trap 228 is provided by the IOV-HC 102 to store trapped requests, such as the request 206. According to some aspects, within the request trap 228 are command mirrors (CM) 254(0)-254(N), each associated with one of the CRIs 204(0)-204(N). A trapped request 206 may be stored in the CM 254(0)-254(N) of the corresponding CRI 204(0)-204(N) from which the request 206 was received. Some aspects may provide that the request trap 228 may generate an interrupt 256 to the VMM 108 via the BRI 200 to indicate that the request 206 is trapped. The VMM 108 may then further process the trapped request 206 by reading contents of the appropriate CM 254(0)-254(N) via the BRI 200 to extract information. The VMM 108 may also direct the IOV-HC 102 via the BRI 200 to generate a response 258 to the originating CRI 204(0)-204(N) using the response generation circuit 230, as indicated by arrow 260.

According to some aspects, once the request 206 is trapped, the request fetch circuit 208 has completed its processing, and may proceed with fetching a next request 206 for another CRI 204(0)-204(N). Until the trapped request 206 is processed by the VMM 108, the particular CRI amongst the CRIs 204(0)-204(N) associated with the trapped request 206 is removed from request fetch arbitration. Only when the VMM 108 processes the request 206 by directing the IOV-HC 102 to forward or discard the request 206 may subsequent requests 206 from the same CRI from amongst the CRIs 204(0)-204(N) be fetched by the request fetch circuit 208.

Figure 3:
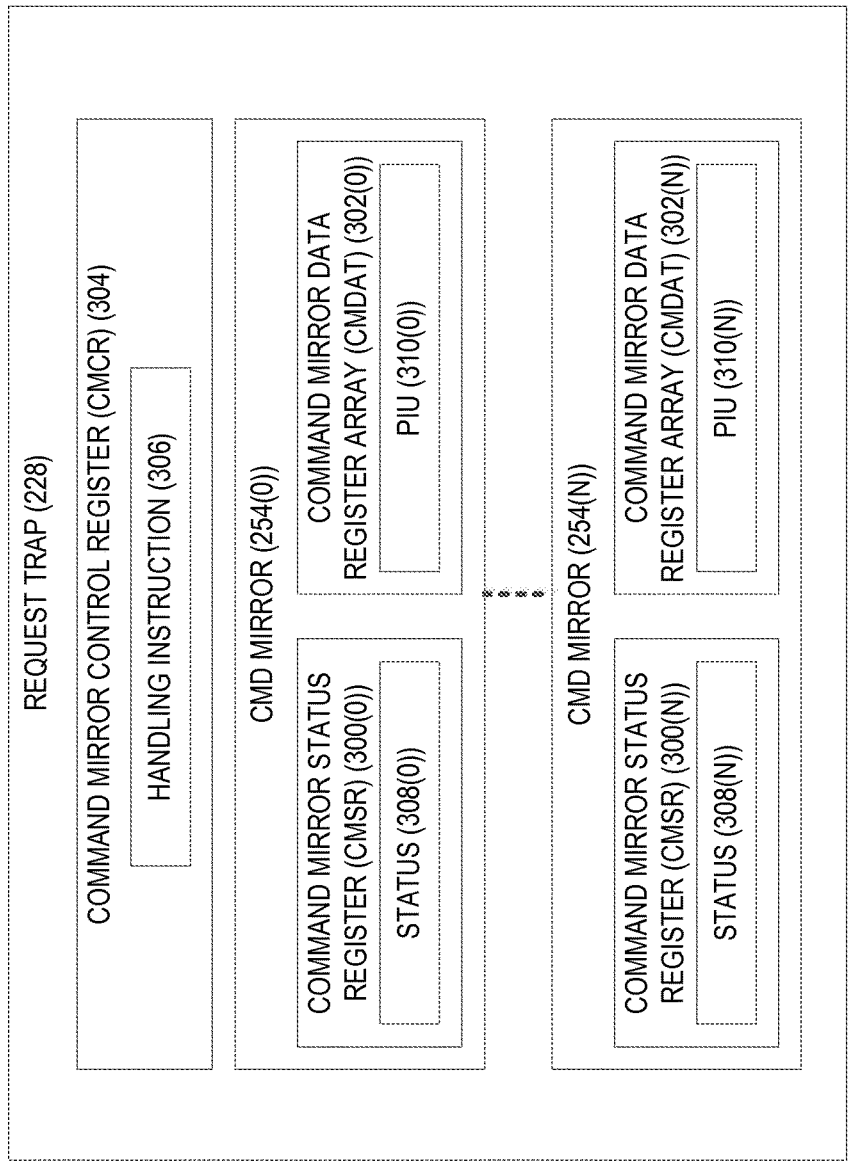
FIG. 3 is a block diagram illustrating elements of an exemplary request trap of the IOV-HC of FIG. 1 for storing a trapped request.

To illustrate exemplary elements of the request trap 228 of the IOV-HC 102 of FIG. 2 for storing a trapped request 206, FIG. 3 is provided. In describing FIG. 3, elements of FIGS. 1 and 2 are referenced for the sake of clarity. As seen in FIG. 3, the request trap 228 includes the CMs 254(0)-254(N) of FIG. 2, each of which corresponds to one of the CRIs 204(0)-204(N) of FIG. 2. Each of the CMs 254(0)-254(N) provides corresponding command mirror status registers (CMSRs) 300(0)-300(N) and command mirror data register arrays (CMDATs) 302(0)-302(N). The request trap 228 further includes a command mirror control register (CMCR) 304. Functionality of each exemplary element of the request trap 228 is described in greater detail below.

The CMCR 304 is a register that may be used by the VMM 108 of FIG. 2 to instruct the IOV-HC 102 regarding how the request 206 that is trapped within the request trap 228 is to be handled. As non-limiting examples, the VMM 108 may send a handling instruction 306 via the CMCR 304 to instruct the IOV-HC 102 to pass the trapped request 206 on to the transport protocol engine 220, or to terminate the trapped request 206 entirely. According to some aspects, the CMCR 304 is shared between all of the CMs 254(0)-254(N).

As noted above, trapped requests such as the request 206 may be stored in the CM 254(0)-254(N) corresponding to the CRI 204(0)-204(N) from which the request 206 was received. To facilitate storage of trapped requests 206, each of the CMSRs 300(0)-300(N) of the CMs 254(0)-254(N) may store a respective status 308(0)-308(N) that represents information regarding each trapped request 206. Each status 308(0)-308(N), according to some aspects, may comprise data such as a slot number (not shown) and/or transfer request descriptor (TRD) information (not shown) associated with the request 206.

The CMDATs 302(0)-302(N) of the CMs 254(0)-254(N) are register arrays, each of which may be used to store a corresponding protocol information unit (PIU) 310(0)-310(N) of each trapped request 206. In some aspects, each of the CMDATs 302(0)-302(N) may allocate thirty-two (32) bytes of space for each CRI 204(0)-204(N) of FIG. 2. In cases where a request 206 is larger than thirty-two (32) bytes (e.g., Descriptor Write Query Requests, as a non-limiting example), the length of the request 206 may be indicated in the corresponding CMSR 300(0)-300(N). The VMM 108 may then calculate a command descriptor address (such as a UFS Command Descriptor (UCD), in aspects based on the UFS standard) in the system memory 216, and read the request 206 directly from its original location in the system memory 216.

Figure 4:
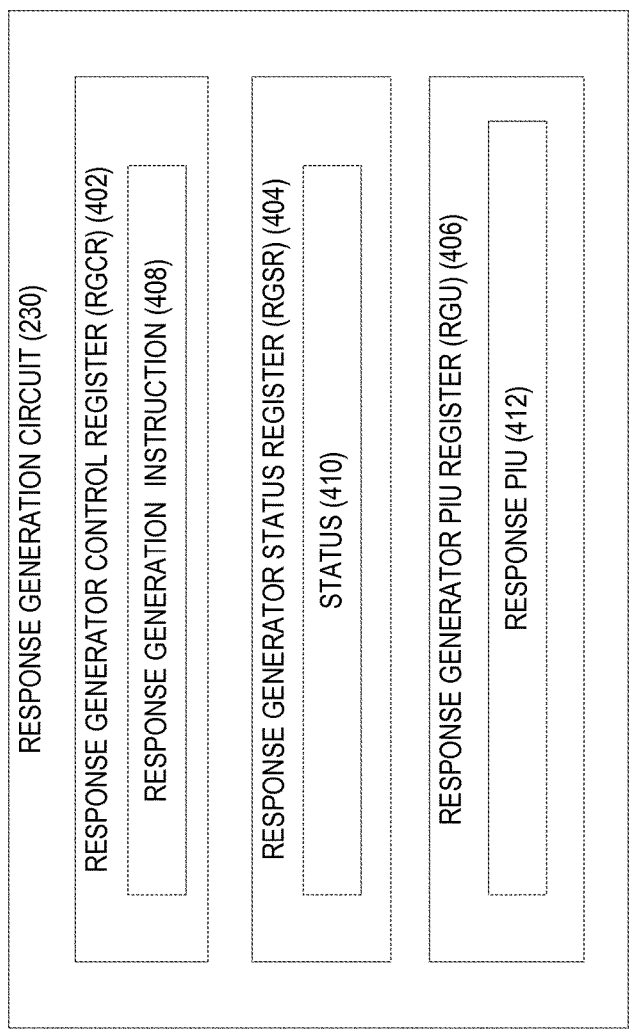
FIG. 4 is a block diagram illustrating elements of an exemplary response generation circuit of the IOV-HC of FIG. 1 for generating responses to be sent to multiple I/O clients.

As discussed above with respect to FIG. 2, some aspects of the IOV-HC 102 provide the response generation circuit 230 to enable the VMM 108 to instruct the IOV-HC 102 to generate the response 258 to be sent to an I/O client 104(0)-104(N) from which a trapped request (such as the request 206) originated. To illustrate exemplary elements of one aspect of the response generation circuit 230 of FIG. 2, FIG. 4 is provided. Elements of FIGS. 1 and 2 are referenced in the description of FIG. 4 for the sake of clarity.

As seen in FIG. 4, the response generation circuit 230 comprises a response generator control register (RGCR) 402, a response generator status register (RGSR) 404, and a response generator PIU register (RGU) 406. The RGCR 402 may be used by the VMM 108 of FIG. 2 to instruct the IOV-HC 102 to transmit the response 258 using a response generation instruction 408, in some aspects. As non-limiting examples, the response generation instruction 408 may include a transmission command, a response transmission method, a destination CRI identifier, and/or an overall command status (OCS). The RGSR 404 of the response generation circuit 230 may store a status 410 regarding the status of the response generation circuit 230. The RGU 406, in some aspects, may comprise a 32-byte register space for storing a response PIU 412 of the response 258 to be transmitted to one of the I/O clients 104(0)-104(N).

Some aspects of the response generation circuit 230 may provide one or both of two (2) response transmission methods. In some aspects, the response transmission method may comprise the response PIU 412 being written to the RGU 406 by the request trap 228. The response PIU 412 may then be copied by the IOV-HC 102 to a location specified in a TRD in a memory space (not shown) of one of the I/O clients 104(0)-104(N) to which the response 258 is directed. Alternatively, some aspects may provide that the VMM 108 may write the response PIU 412 directly to the location in the memory space of the I/O client 104(0)-104(N). Under either transmission technique, the VMM 108 may write the RGCR 402 to instruct the IOV-HC 102 to write an OCS field in the TRD in a memory space of the I/O client 104(0)-104(N) and to generate interrupts 256, as requested by the I/O clients 104(0)-104(N). In some aspects in which the response 258 is larger than thirty-two (32) bytes (e.g., for Descriptor Read Query Requests), the VMM 108 may write the response PIU 412 directly to the location in the memory space of the I/O client 104(0)-104(N).

According to some aspects disclosed herein that are based on the UFS standard, when the VMM 108 writes to the RGCR 402, the IOV-HC 102 may carry out the following exemplary operations. If response copying is required, the IOV-HC 102 may calculate a destination address (not shown) from the CRI identifier and slot number. For example, in aspects based on the UFS standard, the destination address may be calculated based on a Response section of the UCD or UTP Task Management Request Descriptor (UTMRD). The IOV-HC 102 may then copy contents of the response PIU 412 from the RGU 406 to the destination address. The IOV-HC 102 writes the OCS to the destination address in the UFS TRD (UTRD) or UTMRD. The IOV-HC 102 sets a UTP Transfer Request List Door Bell Register (UTRLDBR), a UTP Transfer Request List Clear Register (UTRLCLR), and/or a UTP Task Management Request List Door Bell Register (UTMRLDBR) in the appropriate CRI 204(0)-204(N) to indicate command completion. The IOV-HC 102 may then generate an interrupt 256, if required by the UTRD or UTMRD. In aspects disclosed herein that are based on the eMMC standard, the response PIU 412 is written by the VMM 108 to a response register of the appropriate CRI 204(0)-204(N), after which the VMM 108 instructs the IOV-HC 102 to generate the interrupt 256. It is to be understood that the aspects based on UFS and eMMC discussed above are non-limiting examples.

Figure 5A:
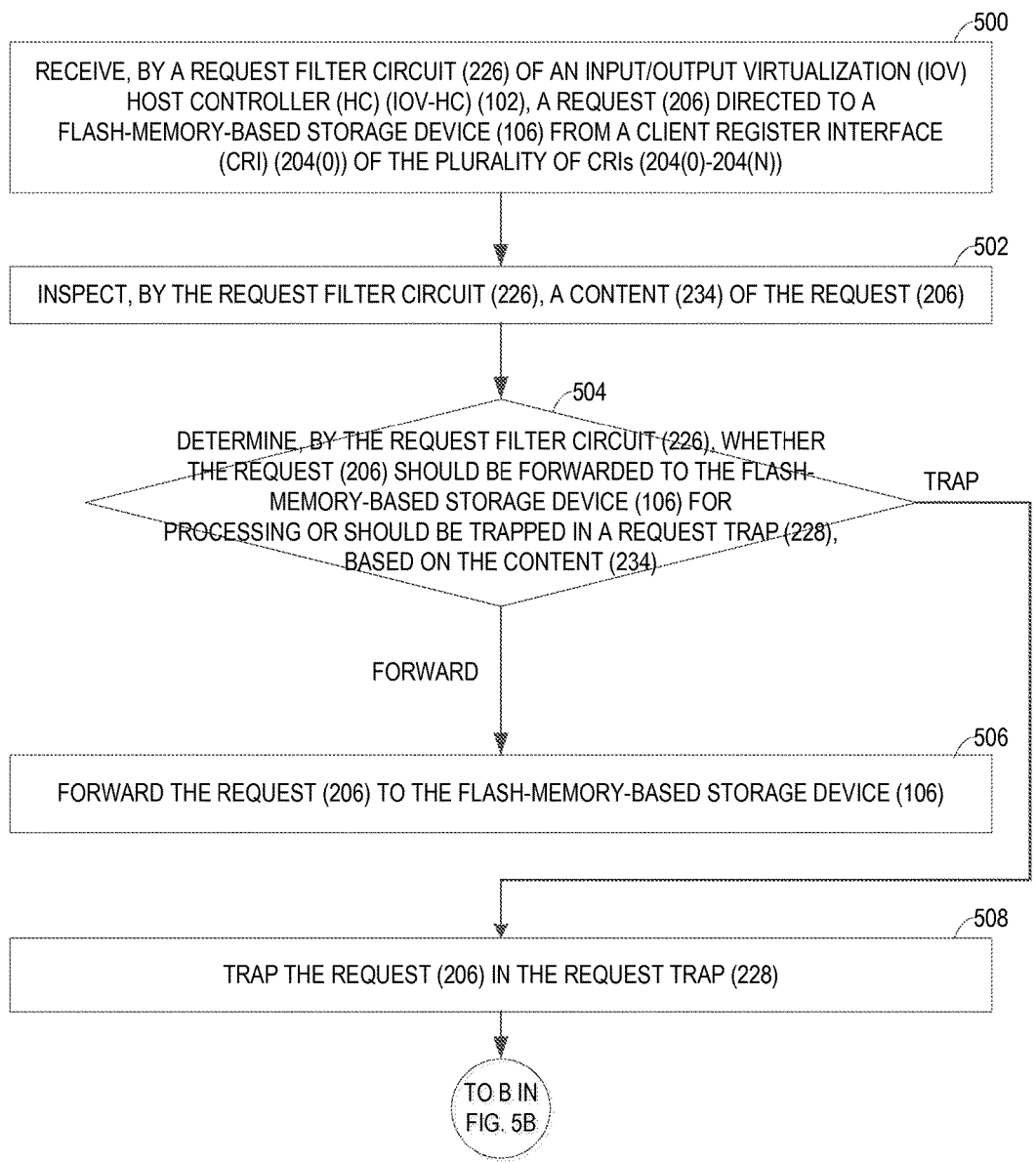
FIGS. 5A and 5B are flowcharts illustrating exemplary operations of the IOV-HC of FIG. 1 for providing command trapping for multiple I/O clients.
Figure 5B:
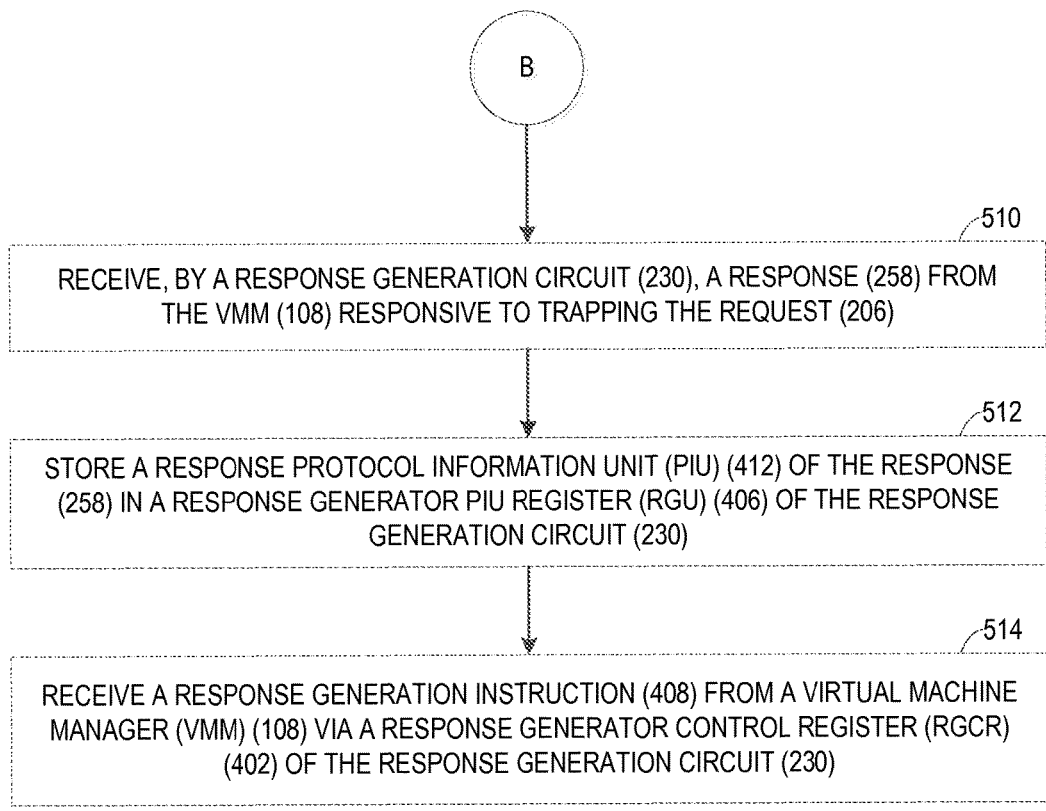

To illustrate exemplary operations of the IOV-HC 102 of FIG. 2 for providing command trapping for multiple I/O clients 104(0)-104(N), FIGS. 5A and 5B are provided. In describing FIGS. 5A and 5B, elements of FIGS. 1, 2 and 4 are referenced for the sake of clarity. In FIG. 5A, operations begin with the request filter circuit 226 of the IOV-HC 102 receiving a request 206 directed to the flash-memory-based storage device 106 from a CRI 204(0) of the plurality of CRIs 204(0)-204(N) (block 500). In this regard, the request filter circuit 226 may be referred to herein as a "a means for receiving a request directed to a flash-memory-based storage device from a CRI." The request filter circuit 226 inspects a content 234 of the request 206 (block 502). As non-limiting examples, in some aspects based on the UFS standard, the request filter circuit 226 may examine a transaction code (TC) and a SCSI op-code (OPC) of the content 234 of the request 206, while in aspects based on the eMMC standard, the request filter circuit 226 may examine a Command Index and a Command Argument of the content 234 of the request 206. The request filter circuit 226 thus may be referred to herein as a "means for inspecting a content of the request."

Based on the content 234, the request filter circuit 226 determines whether the request 206 should be forwarded to the flash-memory-based storage device 106 for processing, or whether the request 206 should be trapped in a request trap 228 (block 504). Accordingly, the request filter circuit 226 may be referred to herein as a "means for determining whether the request should be forwarded to the flash-memory-based storage device for processing or should be trapped." If the request filter circuit 226 determines at decision block 504 that the request 206 should be forwarded, the request filter circuit 226 forwards the request 206 to the flash-memory-based storage device 106 (block 506). In this regard, the request filter circuit 226 may be referred to herein as a "means for forwarding the request to the flash-memory-based storage device." If the request filter circuit 226 determines at decision block 504 that the request 206 should be trapped, the request filter circuit 226 traps the request 206 in the request trap 228 (block 508). Accordingly, the request filter circuit 226 may be referred to herein as a "means for trapping the request in a request trap." As discussed in greater detail below with respect to FIG. 6, some aspects may provide that the decision to forward or trap the request 206 may be based on a type of the request 206 as indicated by the content 234. Processing then resumes at block 510 of FIG. 5B.

Referring now to FIG. 5B, in some aspects, the response generation circuit 230 of the IOV-HC 102 may receive a response 258 from the VMM 108 responsive to trapping the request 206 (block 510). In this regard, the response generation circuit 230 may be referred to herein as a "means for receiving a response to trapping the request." The response generation circuit 230 may store a response PIU 412 of the response 258 in an RGU 406 of the response generation circuit 230 (block 512). Accordingly, the response generation circuit 230 may be referred to herein as a "means for storing the response in an RGPIU." The IOV-HC 102 may then receive a response generation instruction 408 from the VMM 108 via an RGCR 402 of the response generation circuit 230 (block 514). The IOV-HC 102 thus may be referred to herein as a "means for receiving a response generation instruction from a VMM via an RGCR." In some aspects (e.g., aspects based on the eMMC standard), an RGCR 402 may not be employed, and thus the optional operations of block 514 may be omitted.

Figure 6:
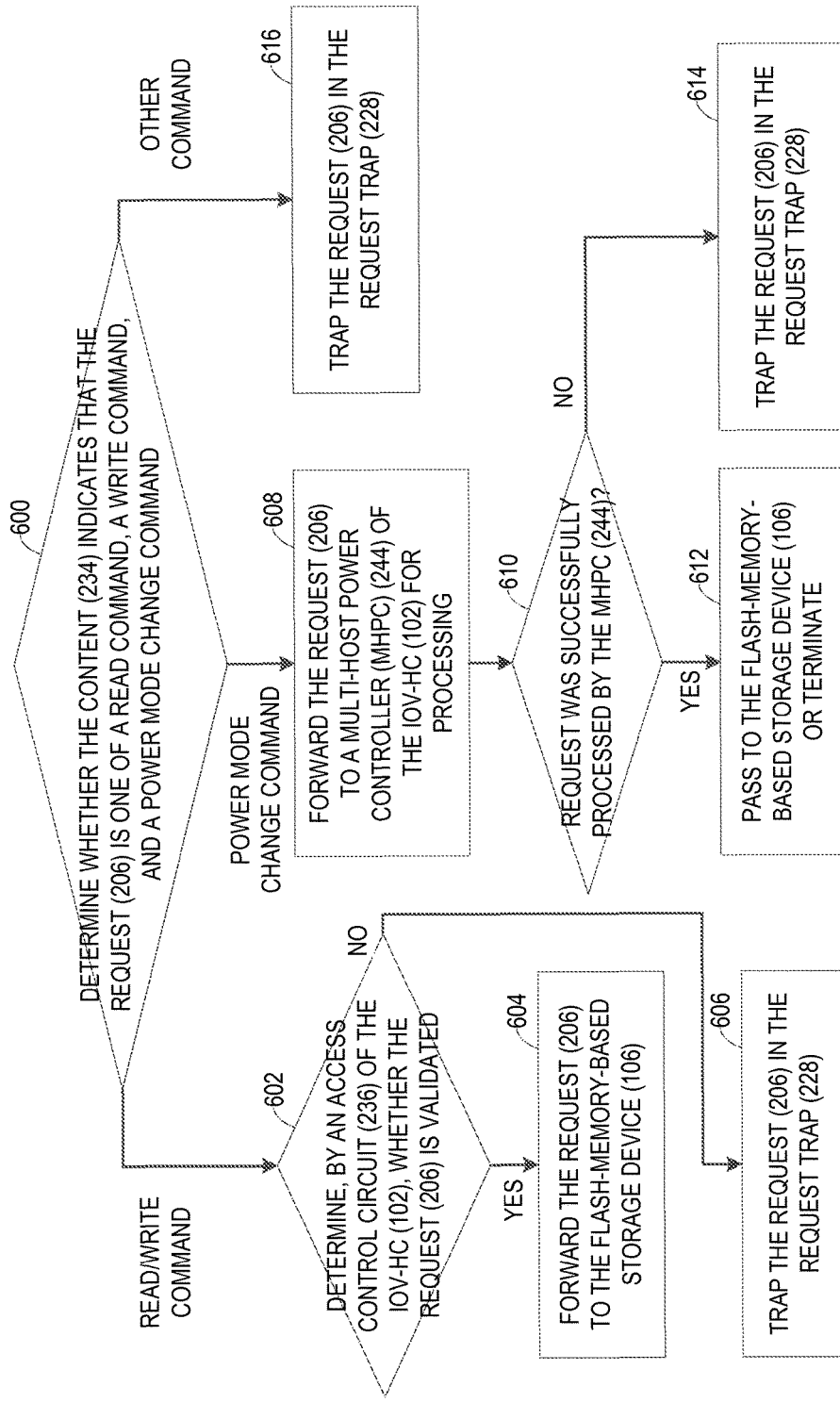
FIG. 6 is a flowchart illustrating exemplary operations of the IOV-HC of FIG. 1 for determining how received requests may be processed and/or trapped.

FIG. 6 is a flowchart illustrating exemplary operations of the IOV-HC 102 of FIG. 2 for determining how received requests may be processed and/or trapped. Elements of FIGS. 1 and 2 are referenced in describing FIG. 6, for the sake of clarity. In some aspects, some operations illustrated in FIG. 6 may correspond to the operations of block 504 of FIG. 5A for determining whether the request 206 should be forwarded to the flash-memory-based storage device 106 for processing, or whether the request 206 should be trapped in the request trap 228.

Operations in FIG. 6 begin with the request filter circuit 226 determining whether the content 234 indicates that the request 206 is one of a read command, a write command, or a power mode change command (block 600). If the request 206 is determined at block 600 to be a read command or a write command, the request 206 may be passed to the access control circuit 236 of the IOV-HC 102, which determines whether the request 206 is validated (block 602). In this regard, the access control circuit 236 may be referred to herein as "a means for determining whether the request is validated." If it is determined at block 602 that the request 206 is validated, the request 206 is forwarded to the flash-memory-based storage device 106 (block 604). If it is determined at block 602 that the request 206 is not validated by the access control circuit 236, the request 206 is trapped in the request trap 228 (block 606).

If the request filter circuit 226 determines at decision block 600 that the request 206 is determined to be a power mode change command, the request 206 is forwarded to the MHPC 244 of the IOV-HC 102 for processing (block 608). Accordingly, the request filter circuit 226 may be referred to herein as a "means for forwarding the request to an MHPC of the IOV-HC for processing." A determination is then made regarding whether the request 206 was successfully processed by the MHPC 244 (block 610). The MHPC 244 thus may be referred to herein as a "means for determining whether the request was successfully processed by the MHPC." If the MHPC 244 successfully processed the request 206, the MHPC 244 either passes the request 206 to the flash-memory-based storage device 106, or terminates the request 206, based on the internal logic of the MHPC 244 (block 612). If the request 206 is not successfully processed by the MHPC 244, the request 206 is trapped in the request trap 228 (block 614). Returning to decision block 600, if the request 206 is determined not to be a read command, a write command, or a power mode change command, the request 206 is trapped in the request trap 228 (block 616). Accordingly, the request filter circuit 226 may be referred to herein as a "means for trapping the request in the request trap responsive to determining that the content indicates that the request is not one of the read command, the write command, or the power mode change command."

Figure 7:
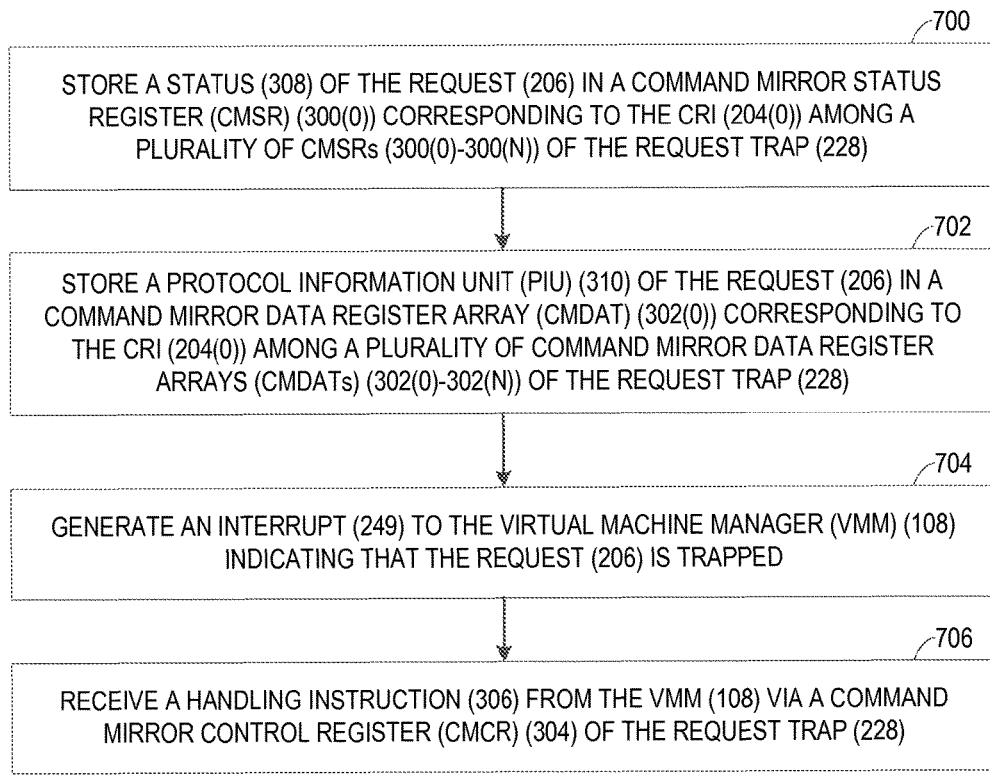
FIG. 7 is a flowchart illustrating exemplary operations of the IOV-HC of FIG. 1 for command trapping using the request trap of FIGS. 2 and 3.

To further illustrate exemplary operations of the IOV-HC 102 in some aspects for command trapping using the request trap 228 of FIG. 2, FIG. 7 is provided. In describing FIG. 7, elements of FIGS. 1-3 are referenced for the sake of clarity. Operations in FIG. 7 begin with the request trap 228 storing a status 308 of the request 206 in a CMSR 300 corresponding to the CRI 204(0) among the plurality of CMSRs 300(0)-300(N) of the request trap 228 (block 700). In this regard, the request trap 228 may be referred to herein as a "means for storing a status of the request in a CMSR corresponding to the CRI." The request trap 228 also stores a PIU 310(0) of the request 206 in a CMDAT 302(0) corresponding to the CRI 204(0) among a plurality of CMDATs 302(0)-302(N) of the request trap 228 (block 702). Accordingly, the request trap 228 may be referred to herein as a "means for storing a PIU of the request in a CMDAT corresponding to the CRI." The request trap 228 next may generate an interrupt 256 to the VMM 108 indicating that the request 206 is trapped (block 704). The request trap 228 thus may be referred to herein as a "means for generating an interrupt to a VMM indicating that the request is trapped." The IOV-HC 102 may then receive a handling instruction 306 from the VMM 108 via the CMCR 304 of the request trap 228 (block 706). In this regard, the IOV-HC 102 may be referred to herein as a "means for receiving a handling instruction from the VMM via a CMCR of the request trap." It is to be understood that the exemplary operations illustrated in FIG. 7 may not be applicable to some aspects disclosed herein, such as aspects based on the eMMC standard.

Command trapping in an IOV-HC of a flash-memory-based storage device according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 8:
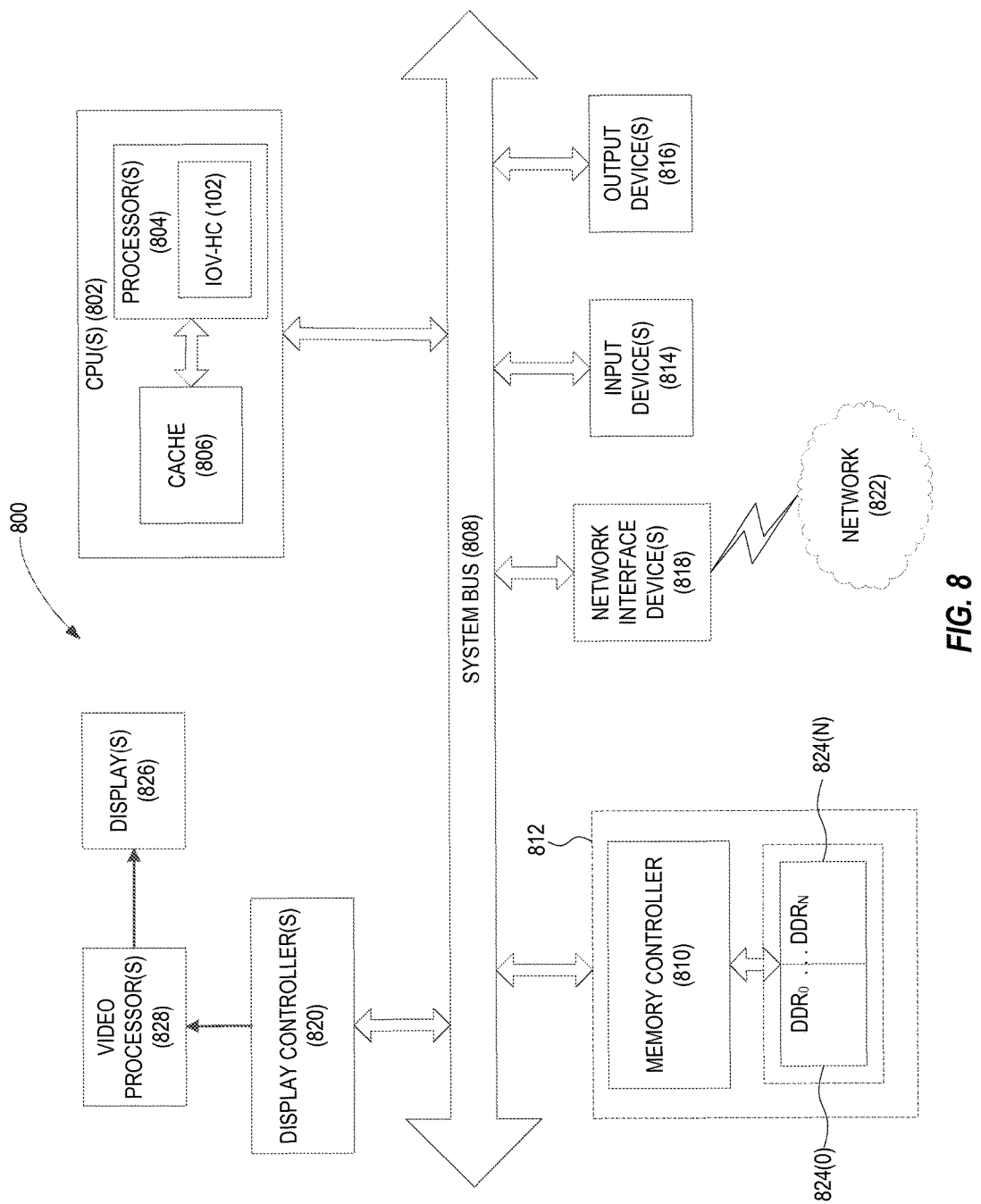
FIG. 8 is a block diagram of an exemplary computing device that may include an SoC that employs the IOV-HC of FIG. 1.

In this regard, FIG. 8 illustrates an example of a processor-based system 800 that can employ the SoC 100 with the IOV-HC 102 of FIG. 1. In this example, the processor-based system 800 includes one or more central processing units (CPUs) 802, each including one or more processors 804. The CPU(s) 802 may have cache memory 806 coupled to the processor(s) 804 for rapid access to temporarily stored data. The CPU(s) 802 is coupled to a system bus 808 and can intercouple devices included in the processor-based system 800. As is well known, the CPU(s) 802 communicates with these other devices by exchanging address, control, and data information over the system bus 808. For example, the CPU(s) 802 can communicate bus transaction requests to a memory controller 810 as an example of a slave device. Although not illustrated in FIG. 8, multiple system buses 808 could be provided.

Other devices can be connected to the system bus 808. As illustrated in FIG. 8, these devices can include a memory system 812, one or more input devices 814, one or more output devices 816, one or more network interface devices 818, and one or more display controllers 820, as examples. The input device(s) 814 can include any type of input device, including but not limited to input keys, switches, voice processors, etc. The output device(s) 816 can include any type of output device, including but not limited to audio, video, other visual indicators, etc. The network interface device(s) 818 can be any devices configured to allow exchange of data to and from a network 822. The network 822 can be any type of network, including but not limited to a wired or wireless network, a private or public network, a local area network (LAN), a wide local area network, wireless local area network, BLUETOOTH (BT), and the Internet. The network interface device(s) 818 can be configured to support any type of communications protocol desired. The memory system 812 can include one or more memory units 824(0)-824(N).

The CPU(s) 802 may also be configured to access the display controller(s) 820 over the system bus 808 to control information sent to one or more displays 826. The display controller(s) 820 sends information to the display(s) 826 to be displayed via one or more video processors 828, which process the information to be displayed into a format suitable for the display(s) 826. The display(s) 826 can include any type of display, including but not limited to a cathode ray tube (CRT), a liquid crystal display (LCD), a light emitting diode (LED) display, a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An input/output virtualization (IOV) host controller (HC) (IOV-HC) communicatively coupled to a plurality of input/output (I/O) clients via a corresponding plurality of client register interfaces (CRIs), and to a flash-memory-based storage device;
the IOV-HC comprising a request trap; and
the IOV-HC configured to:
receive, by a request filter circuit of the IOV-HC, a request directed to the flash-memory-based storage device from a CRI of the plurality of CRIs;
inspect, by the request filter circuit, a content of the request;
determine, by the request filter circuit, whether the request should be forwarded to the flash-memory-based storage device for processing or should be trapped, based on the content, wherein the request filter circuit is configured to determine whether the content indicates that the request is one of a read command, a write command, or a power mode change command;
responsive to determining that the request should be forwarded to the flash-memory-based storage device for processing, forward the request to the flash-memory-based storage device;
responsive to determining that the request should be trapped, trap the request in the request trap;
responsive to determining by the request filter circuit that the content indicates the request is one of the read command or the write command, determine, by an access control circuit of the IOV-HC, whether the request is validated;
forward the request to the flash-memory-based storage device responsive to determining that the request is validated; and
trap the request in the request trap responsive to determining that the request is not validated.

2. The IOV-HC of claim 1, wherein the request trap comprises:
a command mirror control register (CMCR); and
a plurality of command mirrors (CMs) each comprising:
a plurality of command mirror status registers (CMSRs), each corresponding to a CRI of the plurality of CRIs; and
a plurality of command mirror data register arrays (CMDATs), each corresponding to a CRI of the plurality of CRIs; and
the IOV-HC further configured to trap the request in the request trap by being configured to:
store a status of the request in a CMSR corresponding to the CRI among the plurality of CMSRs;
store a protocol information unit (PIU) of the request in a CMDAT corresponding to the CRI among the plurality of CMDATs;
generate an interrupt to a virtual machine manager (VMM) indicating that the request is trapped; and
receive a handling instruction from the VMM via the CMCR.

3. The IOV-HC of claim 1, further comprising a response generation circuit comprising:
a response generator control register (RGCR); and
a response generator protocol information unit (RGPIU); and
the IOV-HC further configured to, responsive to trapping the request in the request trap:
receive, by the response generation circuit, a response to trapping the request;
store a PIU of the response in the RGPIU; and
receive a response generation instruction from a VMM via the RGCR.

4. The IOV-HC of claim 1, further configured to, responsive to determining by the request filter circuit that the content indicates the request is the power mode change command:
forward the request to a multi-host power controller (MHPC) of the IOV-HC for processing; and
determine whether the request was successfully processed by the MHPC;
the IOV-HC configured to trap the request in the request trap responsive to determining that the request was not successfully processed by the MHPC.

5. The IOV-HC of claim 1, further configured to trap the request in the request trap responsive to determining by the request filter circuit that the content indicates that the request is not one of the read command, the write command, or the power mode change command.

6. The IOV-HC of claim 1, communicatively coupled to the flash-memory-based storage device according to an Embedded MultiMedia Card (eMMC) standard.

7. The IOV-HC of claim 1, communicatively coupled to the flash-memory-based storage device according to a Universal Flash Storage (UFS) standard.

8. The IOV-HC of claim 1 integrated into an integrated circuit (IC).

9. The IOV-HC of claim 1 integrated into a device selected from the group consisting of: a set top box; an entertainment unit; a navigation device; a communications device; a fixed location data unit; a mobile location data unit; a mobile phone; a cellular phone; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; and a portable digital video player.

10. A method for providing command trapping for a flash-memory-based storage device for multiple hosts, comprising:
receiving, by a request filter circuit of an input/output virtualization (IOV) host controller (HC) (IOV-HC), a request directed to the flash-memory-based storage device from a client register interface (CRI) of a plurality of CRIs;
inspecting, by the request filter circuit, a content of the request;
determining, by the request filter circuit, whether the request should be forwarded to the flash-memory-based storage device for processing or should be trapped in a request trap, based on the content by determining whether the content indicates that the request is one of a read command, a write command, and a power mode change command;

responsive to determining that the request should be forwarded to the flash-memory-based storage device for processing, forwarding the request to the flash-memory-based storage device;

responsive to determining that the request should be trapped, trapping the request in the request trap; and responsive to determining that the content indicates the request is one of the read command or the write command, determining, by an access control circuit of the IOV-HC, whether the request is validated;

wherein:
  forwarding the request to the flash-memory-based storage device is responsive to determining that the request is validated; and
  trapping the request in the request trap is responsive to determining that the request is not validated.

11. The method of claim 10, wherein trapping the request comprises:
  storing a status of the request in a command mirror status register (CMSR) corresponding to the CRI among a plurality of CMSRs of the request trap;
  storing a protocol information unit (PIU) of the request in a command mirror data register array (CMDAT) corresponding to the CRI among a plurality of CMDATs of the request trap;
  generating an interrupt to a virtual machine manager (VMM) indicating that the request is trapped; and
  receiving a handling instruction from the VMM via a command mirror control register (CMCR) of the request trap.

12. The method of claim 10, further comprising, responsive to trapping the request in the request trap:
  receiving, by a response generation circuit, a response to trapping the request;
  storing the response in a response generator protocol information unit (RGPIU) of the response generation circuit; and
  receiving a response generation instruction from a VMM via a response generator control register (RGCR) of the response generation circuit.

13. The method of claim 10, further comprising, responsive to determining by the request filter circuit that the content indicates the request is the power mode change command:
  forwarding the request to a multi-host power controller (MHPC) of the IOV-HC for processing; and
  determining whether the request was successfully processed by the MHPC;
  wherein trapping the request in the request trap is responsive to determining that the request was not successfully processed by the MHPC.

14. The method of claim 10, wherein trapping the request in the request trap is responsive to determining by the request filter circuit that the content indicates that the request is not one of the read command, the write command, or the power mode change command.

15. The method of claim 10, wherein the flash-memory-based storage device comprises an Embedded MultiMedia Card (eMMC) device.

16. The method of claim 10, wherein the flash-memory-based storage device comprises a Universal Flash Storage (UFS) device.

* * * * *